United States Patent
Johnson

(10) Patent No.: US 7,220,111 B2
(45) Date of Patent: May 22, 2007

(54) HYDRAULIC PUMP

(75) Inventor: Stephen D. Johnson, Hanover, MI (US)

(73) Assignee: Production Research, LLC, Toledo, OH (US)

( * ) Notice: Subject to any disclaimer, the term of this patent is extended or adjusted under 35 U.S.C. 154(b) by 72 days.

(21) Appl. No.: 10/909,609

(22) Filed: Aug. 2, 2004

(65) Prior Publication Data

US 2006/0024187 A1    Feb. 2, 2006

(51) Int. Cl.
*F04C 2/10*    (2006.01)

(52) U.S. Cl. .................. 418/152; 418/61.3; 418/171; 29/888.023

(58) Field of Classification Search ............. 418/61.3, 418/152, 166, 171; 29/428, 888.023
See application file for complete search history.

(56) References Cited

U.S. PATENT DOCUMENTS

| | | | |
|---|---|---|---|
| 4,145,167 A * | 3/1979 | Baatrup .................... 418/61.3 |
| 4,439,119 A * | 3/1984 | Petersen et al. ........... 418/61.3 |
| 4,442,729 A | 4/1984 | Hayakawa |
| 4,459,208 A | 7/1984 | Lemon |
| 4,531,421 A | 7/1985 | Vieth |
| 4,540,347 A | 9/1985 | Child |
| 4,713,980 A | 12/1987 | Ida et al. |
| 4,841,803 A | 6/1989 | Hamano et al. |
| 4,860,612 A | 8/1989 | Dick et al. |
| 5,211,262 A | 5/1993 | Akiyama |
| 5,302,158 A | 4/1994 | Kwasniewski |
| 5,522,477 A | 6/1996 | Byrne |
| 5,634,530 A | 6/1997 | Maekawa et al. |
| 5,740,697 A | 4/1998 | Yamase |
| 6,017,202 A | 1/2000 | Durnack et al. |
| 6,053,718 A * | 4/2000 | Schmidt et al. ............. 418/152 |
| 6,106,255 A * | 8/2000 | Viegas et al. ................ 418/82 |
| 6,186,757 B1 * | 2/2001 | Pippes ........................ 418/171 |
| 6,592,348 B1 * | 7/2003 | Johnson ...................... 418/152 |

* cited by examiner

*Primary Examiner*—Hoang Nguyen
(74) *Attorney, Agent, or Firm*—Butzel Long

(57) ABSTRACT

A fluid pump includes a housing having a lateral wall and an end wall, an insert located in the housing surrounded by the lateral wall and including a body having a central aperture and inlet and outlet fluid channels. A seal, located between the end wall and the insert, seals against fluid flow therebetween. A Gerotor pump mechanism located in the housing adjacent the inlet and outlet fluid channels includes a outer gear and an inner gear engaged with the outer gear for pumping fluid from the inlet fluid channel to the outlet fluid channel as the inner gear rotates relative to the outer gear. A cover, fitted in the housing and spaced axially from the end wall, is located adjacent the inner gear and outer gear and is secured to the housing.

14 Claims, 4 Drawing Sheets

HYDRAULIC PUMP

BACKGROUND OF THE INVENTION

This invention relates to the field of fluid pumps. More particularly, it pertains to a Gerotor fluid pump specially suited for pumping hydraulic fluid such as lubricant.

Under normal operating conditions in most machines and dynamic mechanical assemblies, components that translate or rotate at high speed or under load are continuously supplied with lubricant. The surfaces and devices that support these moving components, such as bearings, journals and bushings, require a reliable, continuous supply of lubricating fluid to avoid frictional wear and excessive temperature. Lubricant generally flows to the support surfaces under positive pressure produced by a lubricant pump and returns due to gravity to a sump connected to the pump inlet. Although heat transferred to the lubricant from the support surfaces is at least partially dissipated by convention and conduction, the lubricant's temperature is nonetheless elevated during the lubrication process.

A Gerotor pump, driven by a shaft of the machine or assembly, is frequently used to supply lubricant though a hydraulic circuit to the friction surfaces of the assembly. Lubricant is generally carried from the pump to the friction surfaces through a passage, which may be an axial bore formed in a shaft of the machine, such as the shaft that drives the pump. Typically, Gerotor pumps have been constructed of precision machined aluminum or other metals. Minimizing the weight of the pump, increasing its durability, and providing elevated temperature performance are important considerations in the design of the pump.

A lubrication pump is usually located in a machine or assembly at a position that is hidden from external view and not easily inspected. It is important, therefore, that it operates reliably and has a long service life. The pump should be self-priming, i.e. the pump inlet should be supplied continuously with a source of fluid in order to avoid cavitation at the inlet, which can damage metal surfaces near the low pressure inlet. It is preferred that metal components in this area be avoided and that synthetic materials be used instead to avoid the susceptibility of metals to cavitation damage.

Since the operating temperature of the lubrication pump is approximately 250° F., thermal expansion of the pump components is an important factor that affects operating efficiency of the pump. It has been discovered that the thermal expansion coefficient of nylon when filled with Kevlar or Teflon can be used to increase efficiency of the pump as its operating temperature increases above ambient temperature.

Gerotor pumps having inner and outer gears produced from powdered metal typically require precision machining, thereby adding to their cost and the complexity of production. By using molded gears produced from nylon, Teflon, and Kevlar, machining costs are minimized, and no precision machining is required.

SUMMARY OF THE INVENTION

A Gerotor pump according to this invention includes an insert, and pumping rings formed of synthetic polymers such as nylon, Teflon, and Kevlar. The insert is formed with an integrally molded spout, which carries fluid to the pump inlet from a sump or other low pressure source. The number of parts in the pump assembly is a minimum. The production and assembly method avoids complexity and error, and results in a high quality pump that is sealed reliably against leakage.

A fluid pump according to this invention includes a housing having a lateral wall and an end wall, an insert located in the housing surrounded by the lateral wall and including a body having a central aperture and inlet and outlet fluid channels. A seal, located between the end wall and insert, seals against fluid flow. A Gerotor pump mechanism, located in the housing adjacent the inlet and outlet fluid channels, includes a outer gear and an inner gear, engaged with the outer gear, for pumping fluid from the inlet to the outlet as the inner gear rotates relative to the outer gear. A cover, fitted in the housing and spaced axially from the end wall, is located adjacent the inner gear and outer gear and is secured to the housing. The cover includes a radial arm for use in securing the pump against rotation.

The pump is produced by forming a hollow housing having a cylindrical lateral wall extending along a central axis, and an end wall located at an axial end of the lateral wall. An insert, formed from synthetic polymers, has a central aperture, an inlet fluid channel, and an outlet fluid channel in fluid communication with the central aperture. A Gerotor pump mechanism including the outer and inner gears is assembled for pumping fluid from the inlet channel to the outlet channel as the inner gear rotates relative to the outer gear. The insert is installed within the housing adjacent the end wall, such that the inlet and outlet fluid channels face away from the end wall. A fluid seal is installed between the end wall and the insert, and the Gerotor pump mechanism is installed within the housing adjacent the insert. Then a cover is secured to the housing such that a substantially liquid tight seal is formed between the end wall and insert by compressing the seal. Finally, a rotatable shaft having a passageway is inserted through the aperture of the cover such that the shaft driveably engages the inner gear and the passageway is located for fluid communication with the outlet channel.

BRIEF DESCRIPTION OF THE DRAWINGS

These and other advantages of the present invention will become apparent to those skilled in the art from the following detailed description of a preferred embodiment when considered in the light of the accompanying drawings in which.

DETAILED DESCRIPTION OF THE PREFERRED EMBODIMENT

Figure 1:
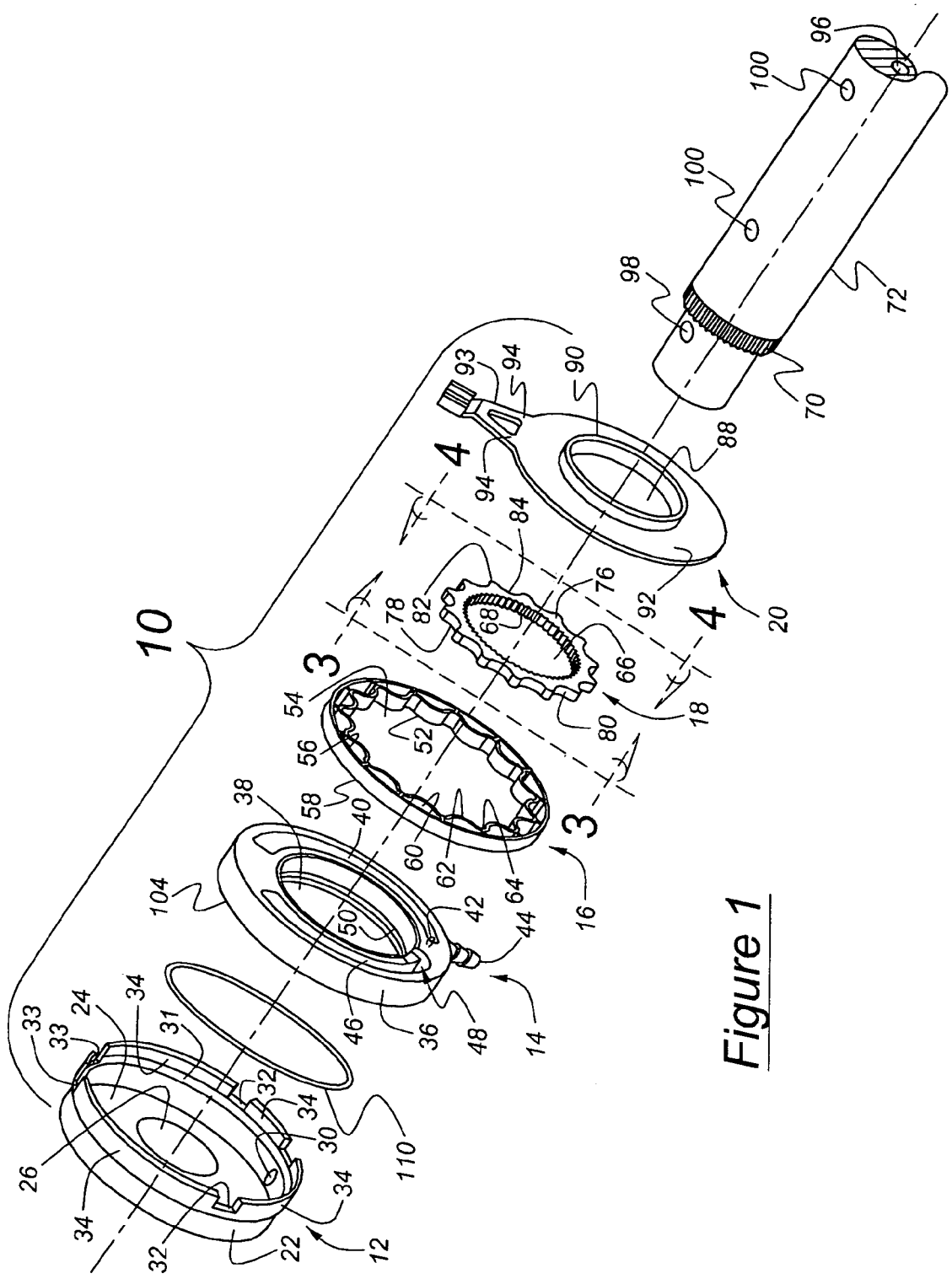
FIG. 1 is an isometric view of a hydraulic fluid pump according to this invention showing the components axially aligned in the assembled order and spaced mutually.

Referring now to the drawings, particularly to FIG. 1, there is shown a hydraulic fluid pump 10 that incorporates the features of the invention. The lubrication pump 10 includes housing 12, an insert 14, an outer gear 16, an inner gear 18, and a cover 20.

The housing 12 includes a hollow cylindrical lateral wall 22 and an end wall 24 surrounding a central aperture 26. An inlet opening 30 is formed through the lateral wall 22. A portion of the lateral wall 22 opposite the end wall 24 is displaced radially outwardly to form a flange or step 31. Multiple slots 32, 33 extending angularly about the axis from the end of the lateral wall 22 opposite the end wall 24, are located between multiple tabs or hems 34, formed on the end of the lateral wall 22 extending from the flange 31. In the embodiment shown, the housing 12 is produced from stamped sheet steel. It is understood that other methods such as precision machining, for example, or other materials, such as a synthetic polymer, for example, could be used to produce the housing 12.

Figure 2:
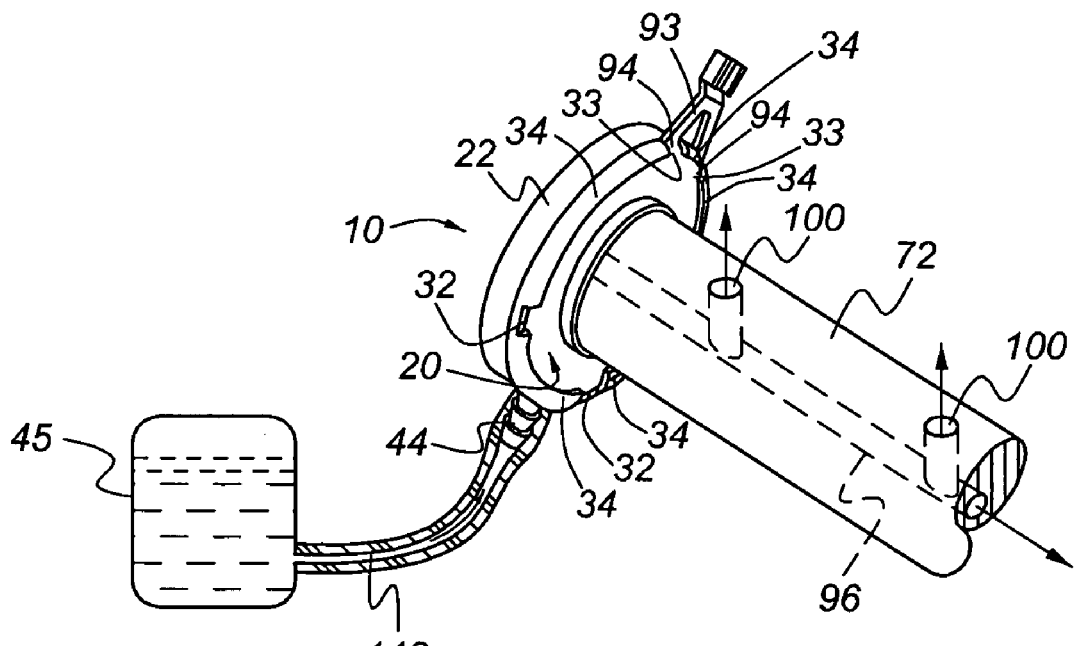
FIG. 2 is an isometric view of the assembled pump of FIG. 1.
Figure 3:
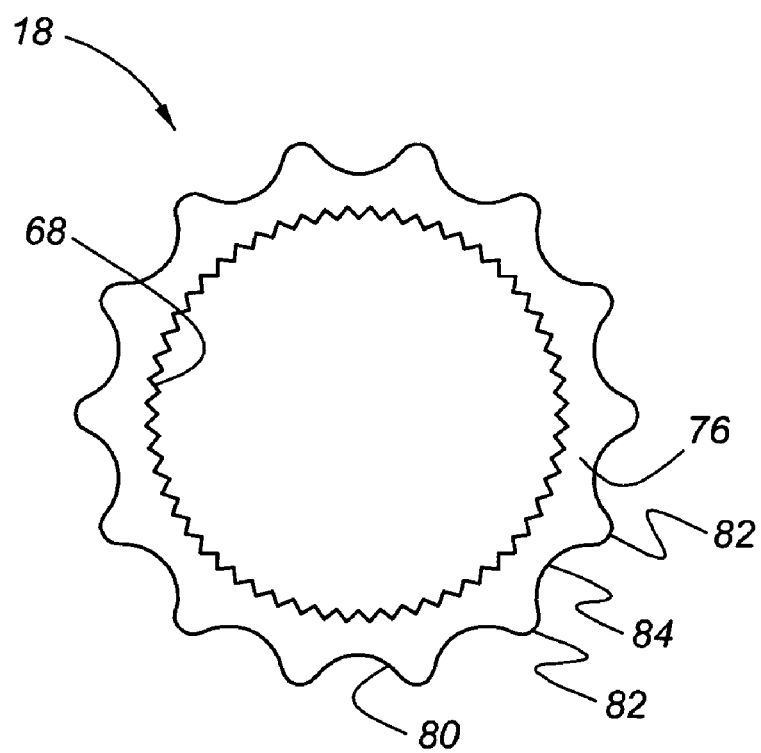
FIG. 3 is a front view of the inner gear taken at plane 3—3 of FIG. 1.

The insert 14 has a cylindrical main body 36 with a central aperture 38. An arcuate inlet fluid channel 40 is located in the main body 36 and is in fluid communication with an inlet aperture 42 connected to a spout 44 which is in fluid communication with a source of lubricating fluid 45, as illustrated in FIG. 2. An arcuate outlet fluid channel 46 is formed in the main body 36 opposite the inlet channel 40. An outlet opening 48 facilitates fluid communication between the outlet channel 46 and the central aperture 38. An annular ridge 50 is disposed on the inner surface of the aperture 38.

The insert is preferably formed of Teflon filled nylon. The Teflon portion of the total volume of the Teflon-nylon mixture is in the range 20–30 percent, preferably 25 percent Teflon. Other synthetic polymers could be used without departing from the scope and spirit of the invention.

A Gerotor pumping mechanism includes the outer gear 16 and the inner gear 18. The outer gear includes an ring having a radially inner surface 52 formed with angularly spaced lobes defined by peaks 62 and valleys 64 surrounding an aperture 54. A front face 56 and a rear face 58 contain multiple pockets 60 extending axially through the thickness of the gear 16. In the embodiment shown, there are fifteen peaks 62 and fifteen valleys 64 formed on the inner surface 52. It is understood that an inner surface 52 having more or fewer peaks 62 and valleys 64 can be used without departing from the scope and spirit of the invention.

The inner gear 18 consists of a disc having a central aperture 66. The inner surface 68 of the inner gear 18 is formed with splines or serrations that engage a splined surface 70 of a shaft 72. Other techniques for driveably engaging the inner gear 18 and the shaft 72 can be used such as a key and keyway, a single D or a double D, for example, without departing from the scope and spirit of the invention.

The inner gear 18 is in the form of a ring having a front face 76 and a rear face 78 and surrounding the central aperture 66. An outer surface 80 has an array of lobes having a plurality of peaks 82 and valleys 84. In the embodiment shown, there are fourteen peaks 82 and fourteen valleys 84 formed in the outer surface 80 of the inner gear 18. It is understood that an outer surface 80 having more or fewer peaks 82 and valleys 84 can be used without departing from the scope and spirit of the invention. The number of peaks 82 and valleys 84 formed on the outer surface 80 will ideally be one less than the number of peaks 62 and valleys 64 formed on the inner surface 52 of the outer gear 16. It is understood that the difference between the number of peaks 82 and valleys 84 formed on the outer surface 80 of the inner gear 18 and the number of peaks 62 and valleys 64 formed on the inner surface 52 of the outer gear 16 can be greater than one.

The outer and inner gears 16, 18 are preferably formed of Kevlar filled nylon. The Kevlar portion of the total volume of the Kevlar-nylon mixture is in the range 20–30 percent, preferably 25 percent Kevlar. Other synthetic polymers could be used without departing from the scope and spirit of the invention.

The cover 20 consists of a disc 92 having a central aperture 88 surrounded by a ring 90, which extends axially from an outer surface of the disc 92. A radial arm 93 is formed with tabs 94, each tab fitted in one of the slots 33. The engagement of the tabs 94 in the slots 33 prevents the pump from rotating when the arm 93 is secured to a fixed structure. Preferably, the cover 20 is produced from stamped sheet steel, but other methods such as machining, and other materials, such as a synthetic polymer, could be used to produce the cover 20.

The rotatable shaft 72 includes an axial bore 96, and splines 70, for engaging the splines 70 on the inner surface 68 of the inner gear 18. The shaft 72 includes a radial hole 98, which communicates with the axial bore 96, and axially spaced passages 100, which carry lubricant from bore 96 radially outward to components being lubricated by the pump 10. When the pump 10 is assembled, fluid flows from the outlet fluid channel 46 through the outlet opening 48 of the insert 14 to the radial hole 98 of the shaft.

Figure 5:
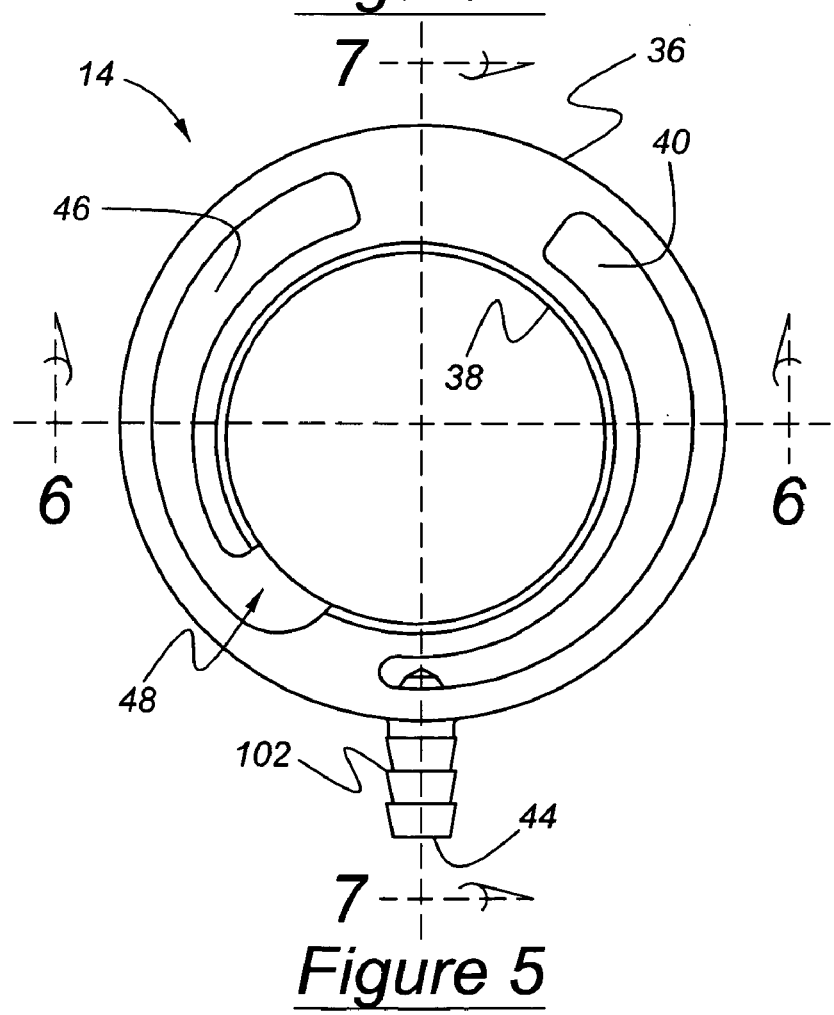
FIG. 5 is front view of the insert.
Figure 6:
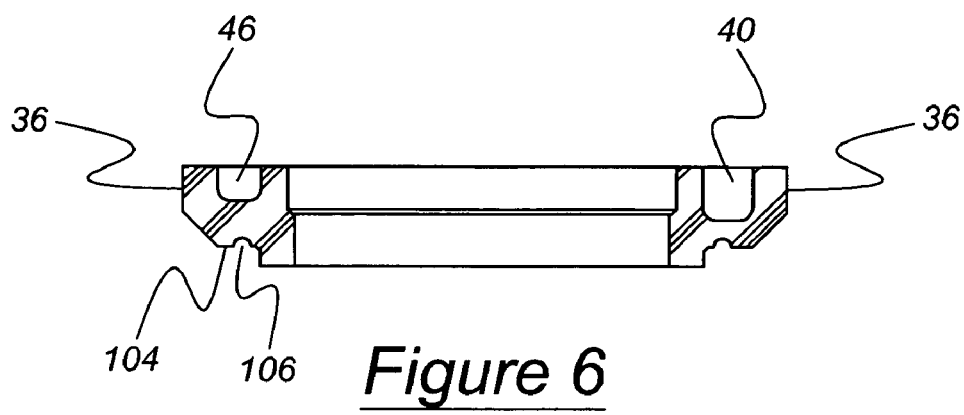
FIG. 6 is a cross section taken at plane 6—6 of FIG. 5.
Figure 7:
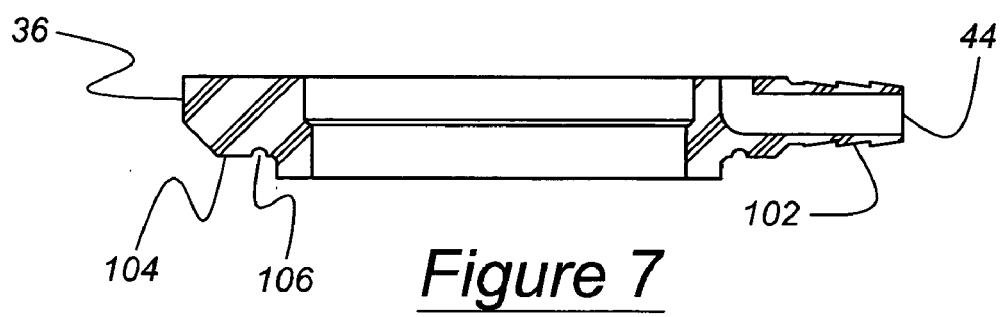
FIG. 7 is a cross section taken at plane 7—7 of FIG. 5.

Referring to FIGS. 5–7, the insert 14 is formed integrally with the spout 44, whose outer surface is formed with barbs 102 for positively engaging a tube or similar hydraulic line connected to the source of fluid lubricant 45. The axial face 104 of the insert 14 located adjacent the end wall 24 is formed with an annular recess 106, into which is fitted a seal 110, preferably an O-ring shown in FIG. 1, which contacts the axial inner surface of the end wall 24. The seal 110 is compressed between the end wall 24 and insert recess 106 when the housing 12 and cover 20 are secured mutually after assembling the insert 14 in the housing 12. In this way, the space between the housing 12 and insert 14 is sealed against the passage of hydraulic fluid.

Figure 4:
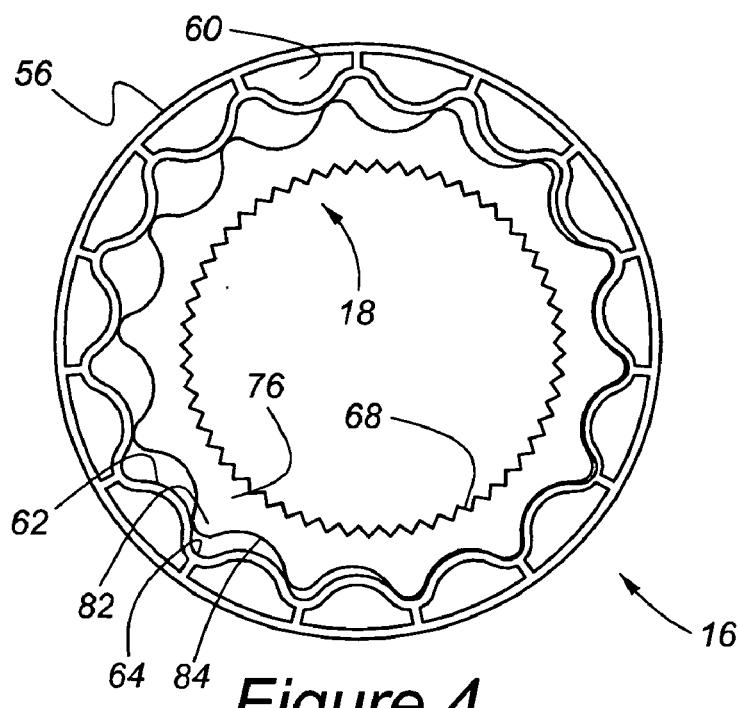
FIG. 4 is a front view of the inner gear and outer gear, in the assembled position taken at plane line 4—4 of FIG. 1.
Figure 8:
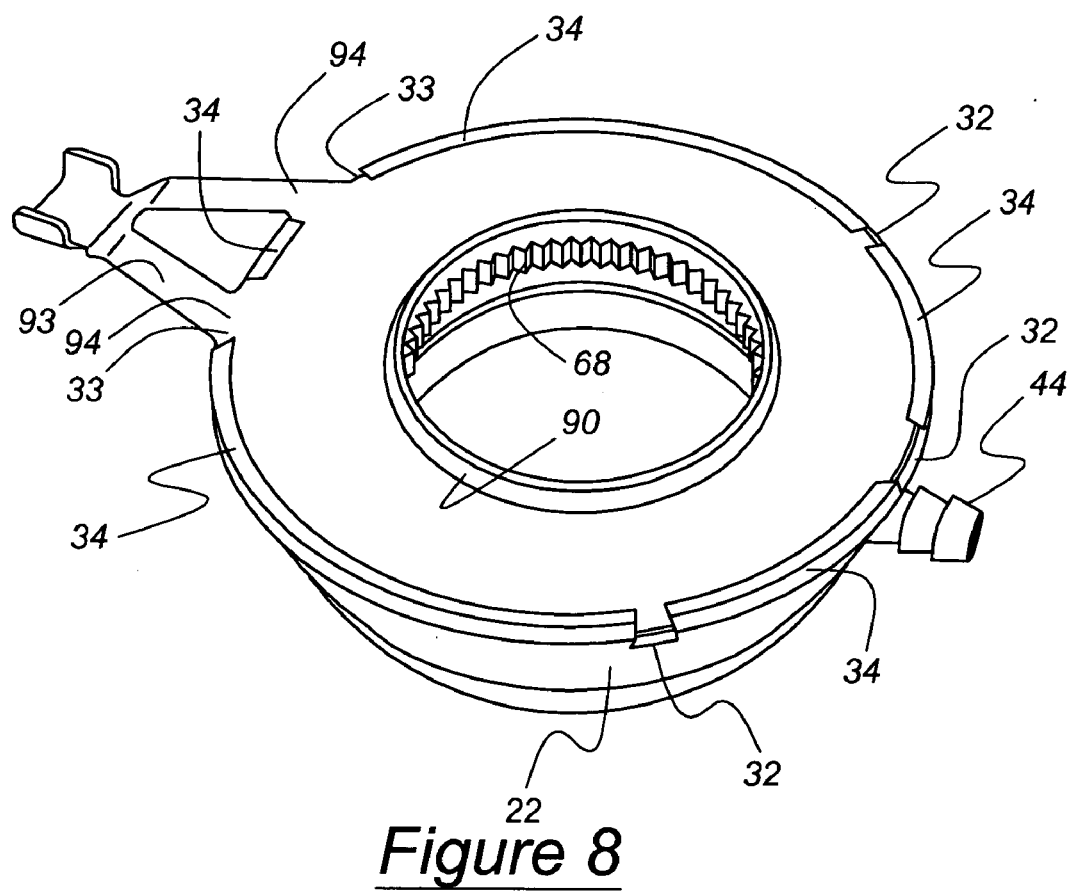
FIG. 8 is an isometric view of the assembled pump.

To assemble the pump 10, the insert 14 is inserted into the hollow portion of the housing 12 such that the channels 40 and 46 face away from the end wall 24, and the spout 44 extends radially through the opening 30 in the lateral wall 22, as shown in FIGS. 1 and 8. The lobes of the inner gear 18 are engaged with the lobes of the outer gear 16, as illustrated in FIG. 4, and the gears are inserted into the housing 12 adjacent the insert 14.

The cover 20 is then mated to the housing 12 such that the tabs 94 are located in the slots 33 between the hems 34. The hems 34 of the housing 12 are then turned over upon the surface 92 of the cover 20, thereby overlapping the cover 20, securing the housing 12 to the cover 20, and preventing rotation of the cover 20 relative to the housing 12. The cover 20 seats against the surface of the flange 31 and closes the open end of the housing 12 to encase the insert 14, outer gear 16, and inner gear 18 in the housing 12.

The shaft 72 is inserted through the central aperture 88 of the cover 20 to produce a substantially liquid-tight seal therebetween. The splined surface 70 of thee shaft 72 engages the splined inner surface 68 of the inner gear 18. The radial aperture 98 of the shaft 72 is located adjacent the inner surface of the insert 14 to facilitate fluid communication with the outlet opening 48 of the outlet channel 46. A conduit 112 hydraulically connects the inlet aperture 42 with the source of fluid lubricant 45, as schematically illustrated in FIG. 2.

In operation, the shaft 72 is rotated clockwise by connecting it to a rotating driver (not shown), as viewed from the right in FIG. 2. The inner gear 18 rotates within the outer gear 16. Since there are fewer peaks 82 and valleys 84 on the inner gear 18 than there are peaks 62 and valleys 64 on the outer gear 16, the inner gear 18 revolves as it rotates without causing the outer gear 16 to rotate. As the inner gear 18 rotates, fluid is pumped from the source 45 through the conduit 112, and into the pump 10. Within the pump 10, the fluid flows through the spout 44, into the inlet channel 40, into spaces between the lobes of the outer gear 16 and inner gear 18, the outlet channel 46 and the outlet opening 48, to the radial aperture 98 and into the axial bore 96. The fluid then flows from the lubrication apertures 100 to bearings, bushings, or journals (not shown) that require lubrication. The radial arm 93 is secured in position to a fixed structure (not shown) to prevent rotation of the pump 10 as the shaft 72 rotates.

The pump prime must be maintained so that a sufficient flow rate of lubrication fluid is pumped to the friction surfaces and bearings.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A fluid pump comprising:
   a hollow housing including a lateral wall spaced radially from and extending along a central axis, and an end wall located at an axial end of said lateral wall;
   an insert located in said housing and surrounded by said lateral wall, including a body facing said end wall having a central aperture, an inlet fluid channel, and an outlet fluid channel in fluid communication with said central aperture;
   a seal located between said end wall and said insert for sealing against fluid flow therebetween;
   an outer gear located in said housing adjacent said insert, including a radial inner surface formed with lobes having angularly spaced peaks and valleys extending around said radial inner surface;
   an inner gear located adjacent said insert and surrounded by said outer gear, including a radial outer surface formed with lobes having angularly spaced peaks and valleys extending around said radial outer surface, being complementary to and engaging said lobes of said outer gear, a first number of said lobes on said radial outer surface being at least one less than a second number of said lobes on said radial inner surface, for pumping fluid located in spaces between said lobes from said inlet fluid channel to said outlet fluid channel as said inner gear rotates relative to said outer gear;
   a cover fitted to said housing, having an aperture, including a surface spaced axially from said end wall and located adjacent said inner gear and said outer gear, secured to and closing said housing; and
   wherein said housing further comprises multiple hems, each said barn extending axially from and along a portion of a circumference of said lateral wall, and multiple slots located angularly between adjacent ones of said hems at said circumference of said lateral wall, and said cover further includes an arm formed integrally with multiple tabs, each said tab extending radially through a corresponding one of said slots, whereby said cover is secured to said housing.

2. The pump of claim 1 further comprising a rotatable shaft extending through said aperture of said cover, driveably engaging said inner gear, and having a passage communicating with said outlet fluid channel.

3. The pump of claim 1, wherein said cover is releasably secured to said housing against rotation relative to said housing.

4. The pump of claim 1 wherein said insert is fanned of a synthetic polymer and formed integrally with a spout extending radially from said inlet channel.

5. The pump of claim 1 wherein said insert is molded of a synthetic polymer and formed integrally with a spout extending radially from said inlet channel through said lateral wall, said spout including an outer surface formed with barbs spaced along a length of said spout for connection to a source of hydraulic fluid.

6. The pump of claim 1 wherein said insert includes a planar surface facing said end wall, said surface being tuned with an annular recess surrounding said central axis; and said seal is an O-ring fitted in said recess and contacting said end wall.

7. The pump of claim 1, wherein said housing and said cover are formed of sheet metal, and said inner gear and said outer gear are formed of a synthetic polymer.

8. A fluid pump comprising:
   a hollow housing including a cylindrical lateral wall spaced radially from and extending
   along a central axis, and an end wall located at an axial end of said lateral wall;
   an insert located in said housing and surrounded by said lateral wall, including a body facing said end wail having a central aperture, an inlet fluid channel, and an outlet fluid channel in fluid communication with said central aperture;
   a seal located between said end wall and said insert for sealing against fluid flow therebetween;
   a Gerotor pump mechanism located in said housing adjacent said inlet fluid channel and said outlet fluid channel, including a outer gear and an inner gear engaged with said outer gear for pumping fluid from said inlet fluid channel to said outlet fluid channel as said inner gear rotates relative to said outer gear;
   a cover fitted in said housing, having an aperture, including a surface spaced axially from said end wall and Located adjacent said hurt gear and said outer gear, secured to, and closing said housing; and
   wherein said housing further comprises multiple hems, each said hem extending axially from and along a portion of a circumference of said lateral wall, and multiple slots each located angularly between adjacent ones of said hems at said circumference of said lateral wall, and said cover further includes an arm formed integrally with multiple tabs, each said tab extending radially through an associated one of said slots, whereby said cover is secured to said housing.

9. The pump of claim 8 further comprising a rotatable shaft extending through said aperture of said cover, driveably engaging said inner gear, and having a passage communicating with said outlet fluid channel.

10. The pump of claim 8 wherein said insert is formed of a synthetic polymer and formed integrally with a spout extending radially from said inlet channel.

11. The pump of claim 8 wherein said insert is molded of a synthetic polymer and formed integrally with a spout extending radially from said inlet channel through said lateral wall, said spout including an cuter surface formed with barbs spaced along a length of said spout for connection to a source of hydraulic fluid.

12. The pump of claim 8 wherein said insert includes a planar surface facing said end wall, said surface being fanned with an annular recess surrounding said central aperture, and said seal is an O-ring fitted in said recess and contacting said end wall.

13. The pump of claim 8 wherein said housing includes a radially outwardly extending flange and said cover abuts said flange.

14. The pump of claim 1 wherein at least one of the insert, the inner gear and the outer gear is formed of a mixture of Teflon and nylon, the Teflon position of the total volume of the mixture being in die range 20–30 percent.

* * * * *